May 20, 1947. G. D. McCANN, JR., ET AL 2,420,891
ANALYZER
Filed Nov. 23, 1944 4 Sheets-Sheet 1

WITNESSES:
E. A. McCloskey
Wm. B. Sellers

INVENTORS
Gilbert D. McCann, Jr.
and Harry E. Criner.
BY
Paul E. Friedemann
ATTORNEY

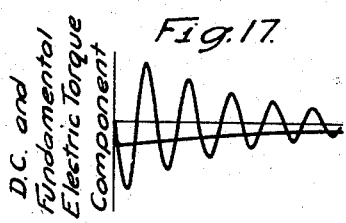
Fig. 17.
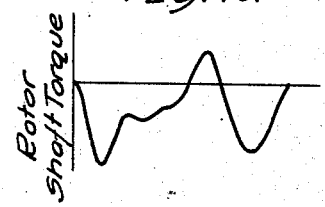
Fig. 19.
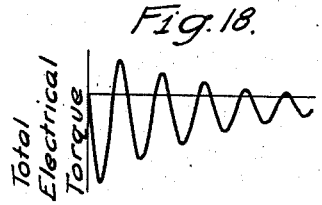
Fig. 18.
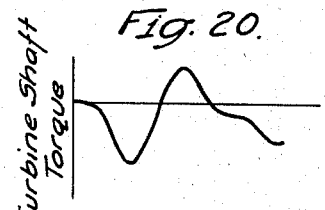
Fig. 20.
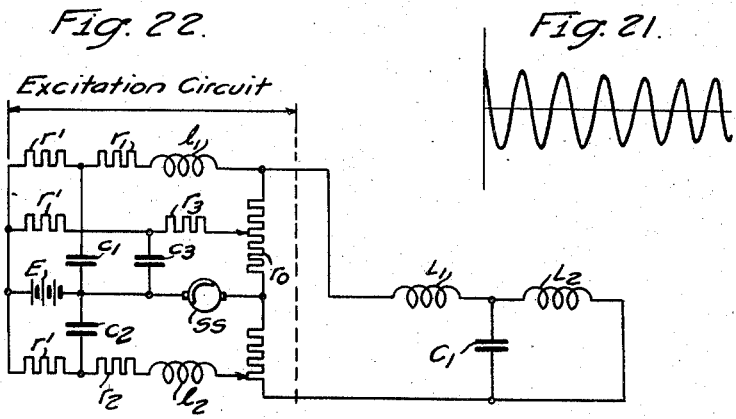
Fig. 22.
Fig. 21.

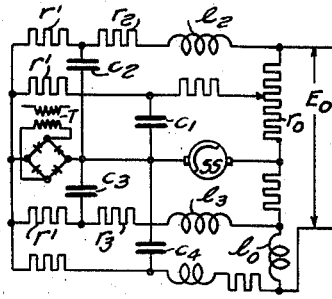
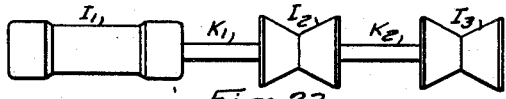
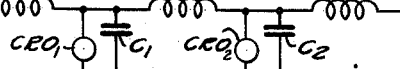
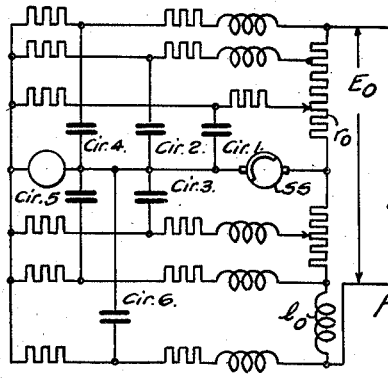
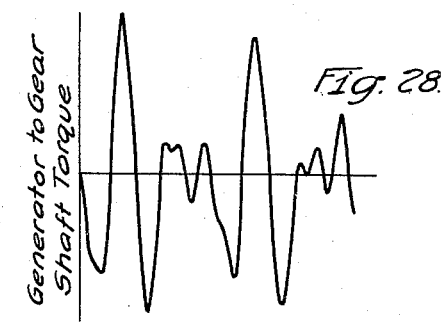
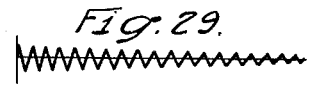
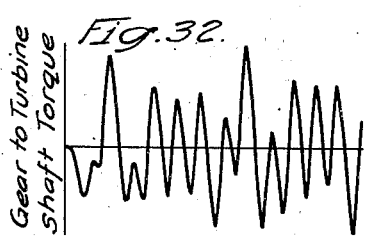
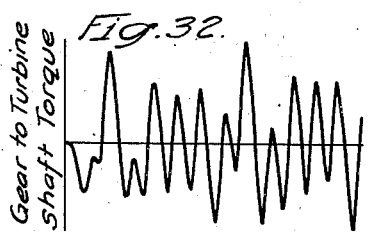

May 20, 1947.  G. D. McCANN, JR., ET AL  2,420,891
ANALYZER
Filed Nov. 23, 1944  4 Sheets-Sheet 4
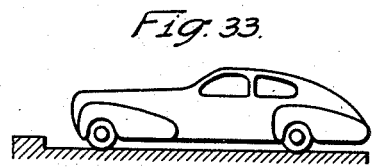
Fig. 33.
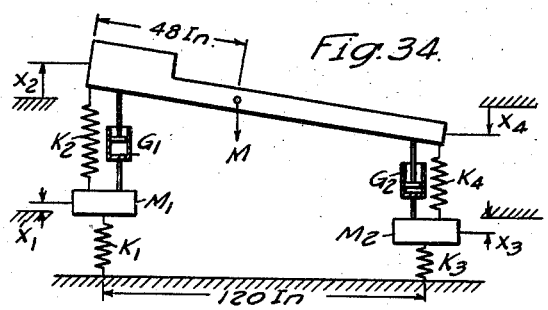
Fig. 34.
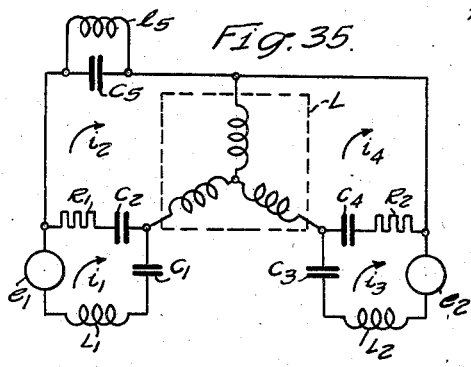
Fig. 35.
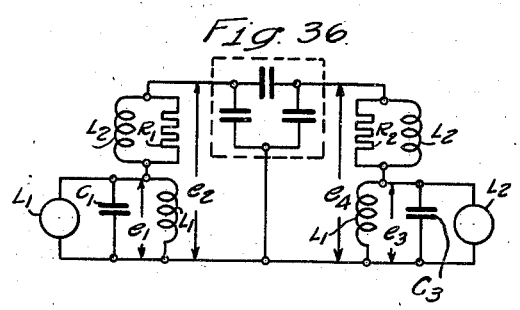
Fig. 36.
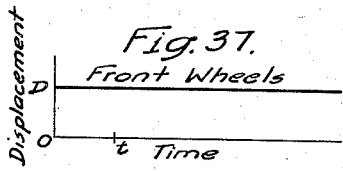
Fig. 37. Front Wheels
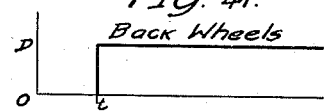
Fig. 41. Back Wheels
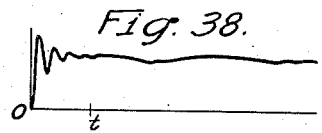
Fig. 38.
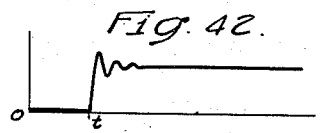
Fig. 42.
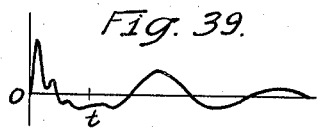
Fig. 39.
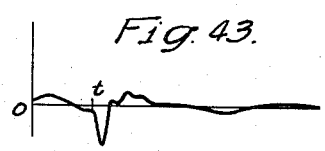
Fig. 43.
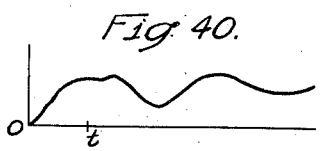
Fig. 40.
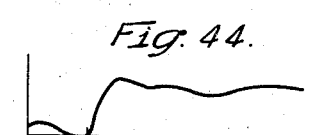
Fig. 44.
WITNESSES:
E. A. McCloskey
Wm. R. Sellers
INVENTORS
Gilbert D. McCann, Jr.
Harry E. Criner.
BY
Paul E. Friedemann
ATTORNEY Patented May 20, 1947

2,420,891

UNITED STATES PATENT OFFICE 2,420,891

ANALYZER

Gilbert D. McCann, Jr., Pittsburgh, and Harry E. Criner, Forest Hills, Pa., assignors to Westinghouse Electric Corporation, East Pittsburgh, Pa., a corporation of Pennsylvania Application November 23, 1944, Serial No. 564,881

5 Claims. (Cl. 235—61)

This invention relates generally to a means for electrically ascertaining or determining the response of a physical system to a known set of forcing functions acting thereon, whether such quantities are of a static or transient character.

Fundamentally, the invention is directed to a means for determining, on the basis of electrical analogy, the response or reaction of a physical system when such system is operating under a known set of conditions.

More specifically stated, the invention is directed to a means of electrical analysis of a physical system, which provides for the production of electrical quantities indicative of the forcing functions acting in or on the physical system to be analyzed, which introduces the electrical quantities thus produced into the electrical counterpart of the physical system to be analyzed, according to the electrical analogy of the manner in which the forcing functions are introduced, or act upon or in the physical system, and which thereafter ascertains, or provides for the determination of, the electrical reactions in the electrical counterpart of the physical system.

Present day requirements of various types of apparatus which depend at least in part, if not entirely, upon mechanical elements for their performance, for example, electrical generators and automobiles to mention a few, require that the utmost in performance be obtainable. Thus it becomes essential that many quantities heretofore estimated, or otherwise approximated, be determined with a high degree of accuracy. These requirements, together with other considerations forming the basis of good design practice, have brought about many problems, the rational solution of which depends upon a knowledge of the transient response of a physical or mechanical system to various driving forces. While the laws governing the response of individual elements of a system are relatively simple, the combination of many elements in a complex system, when mathematically expressed, frequently results in sets of differential equations, the solution of which presents a formidable problem. In this respect, many mechanical vibration problems are too complex for solution by conventional analysis. At the present time there are several methods by which a determination of the quantities involved may be had. These include mechanical calculators, test measurements on full scale models, and measurements on dynamic prototypes. The prototype may consist of an equivalent mechanical system or consist of an analogous electrical circuit.

This invention is of general application and is not necessarily limited to any one particular type of physical problem, but is applicable in any physical problem susceptible of definition by a linear equation. In most of the discussions which follow the problems are of a mechanical nature and may be defined by constant coefficient linear differential equations. It is not to be construed that the invention is limited to mechanical systems or systems defined by linear equations involving constant coefficients.

In the case of mechanical systems, the general principle of the mathematical analogy between mechanical and electrical systems has been known for many years. The electrical engineer has at times found it convenient to set up the mechanical analogy of an electrical system to better visualize its function. On the other hand, it has been found that many of the methods utilized for the analysis of electrical circuits are applicable to mechanical systems. Hence, in view of the difficulties quite often involved in following the course of a rigid mathematical analysis in a given mechanical problem, it is frequently desirable to set up the electrical counterpart thereof, then impose suitable electrical quantities representing the known conditions of the problem, on the electrical counterpart, and by means of suitable electrical indicating or recording devices determine the desired mechanical quantities. This procedure affords many advantages over other methods because it is relatively simple and cheap to construct and connect together properly the analogous electrical constants suitable for studying a wide range of problems. With this method the complete solution as a function of time can be quickly recorded or indicated as voltages or currents.

Applicants are aware that analogous electrical circuits have been utilized in the past for steady-state problems and have been proposed for transient solutions. This invention, however, provides a new method and device, which device may be identified as a transient analyzer capable of solving both steady-state and transient physical problems.

A primary object of this invention is to provide a device useful in solving various physical problems.

Another object of this invention is to provide a device of the character mentioned which is the electrical analogy of the particular physical system under study.

A specific object of this invention is to provide an electrical device of the character mentioned including a circuit system which is the electrical counterpart of the particular physical system under study, which produces electrical quantities representative of known conditions under which the physical system must operate, to energize said circuit system, which utilizes such quantities and which thereafter provides an indication or record of the response of the electrical device to said quantities.

A further specific object of this invention is to provide an analyzer for solving problems relating to physical systems which may be defined by linear mathematical expressions, which provides for the production of electrical quantities representative of known conditions under which the physical system must operate, which introduces such quantities into the electrical counterpart of the physical system in a manner electrically analogous to the manner in which the known conditions under which the physical system must operate affect the physical system, and which thereafter provides an electrical response or change representative of the solution of the physical problem.

Yet another specific object of this invention is to provide an electrical device for analyzing physical problems including a pair of circuits, one representing the physical problem and the other for producing the forcing functions entering into the physical problems, in which the pair of electrical circuits are electrically related and in effect isolated.

A still further specific object of this invention is to provide an electrical analyzer of the character referred to which provides for the electrical reproduction of the forcing functions acting in the physical system, which provides an electrical counterpart of the physical system, and which energizes said electrical counterpart according to the electrical forcing functions by means of a low impedance circuit.

Other objects and advantages will become apparent upon a study of the following disclosure when considered in conjunction with the accompanying drawings in which.

Figure 1:
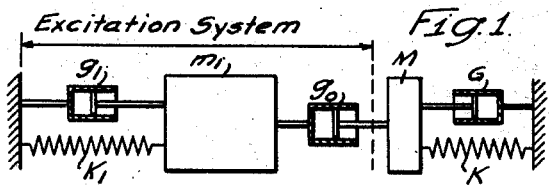
Figure 1 is an illustration of a simple mechanical problem.
Figure 3:
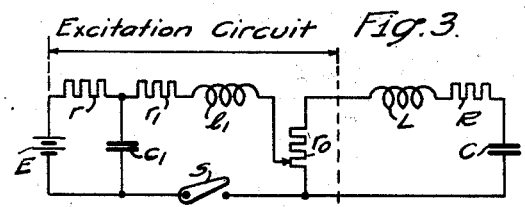
Figure 4:
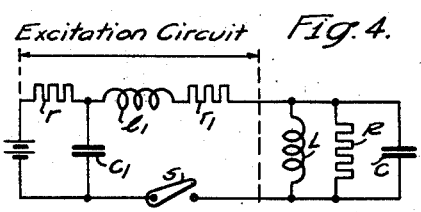
Figure 5:
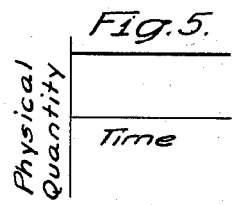
Figure 6:
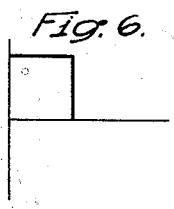
Figure 7:
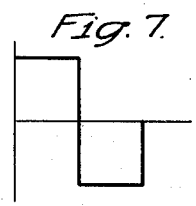
Figure 8:
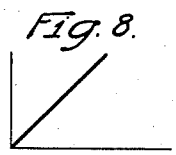
Figure 9:
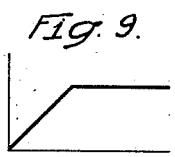
Figure 10:
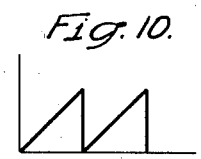
Figure 11:
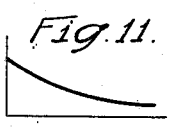
Figure 12:
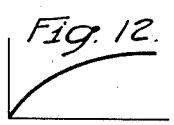
Figure 13:
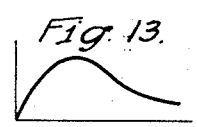
Figure 14:
Figure 15:
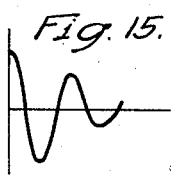
Figure 16:
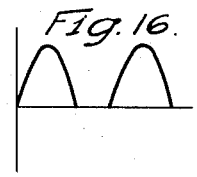

Fig. 3 is a circuit illustrating the fundamental principles of this invention and which is the electrical analogy of the mechanical system of Fig. 1, Fig. 4 is a modified form of the invention illustrated in Fig. 3, Figs. 5–16 illustrate a few of the transient forcing functions obtainable with the electrical excitation circuits, Figs. 17–21 illustrate typical forms of electrical torque produced on a generator rotor in a mechanical system of the type shown in Fig. 23, Fig. 22 is a diagrammatic showing of an excitation circuit which may be employed to produce the electrical equivalents of the electrical torque of the preceding figures, Fig. 23 is a mechanical system schematically illustrating a turbogenerator drive, Fig. 24 is an illustration of the electrical analogy circuit based on the mechanical system of Fig. 23, Fig. 25 illustrates a modified form of turbogenerator drive, and Fig. 26 is an illustration of the electrical analogy circuit based on the mechanical system of Fig. 25, Figs. 27–32 illustrate the total electrical torque and the resulting transient torque on each of the three shafts in the mechanical system of Fig. 25. Of this group of figures, namely Figs. 29 and 30, represent the timing cycle sweep for the curves of Figs. 27 and 31 and the curves of Figs. 28 and 32, respectively, Fig. 33 illustrates a mechanical problem involving a vehicle, Fig. 34 is the mechanical schematic equivalent of the problem illustrated in Fig. 33, Figs. 35 and 36 illustrate two types of electrical analogy circuits based on the mechanical system of Fig. 34, Figs. 37–44 illustrate graphically the movements and relative displacement of the various elements of the vehicle as determined with the electrical analyzer.

In general, the analyzer of this invention comprises three principal parts:

1. An excitation circuit for generating electrical quantities or forcing functions representative of physical quantities acting in the physical system.

2. The electrical circuit which is the electrical counterpart or analogy of the physical system.

3. And circuit means for applying the forcing functions to the analogy circuit, that is, the electrical circuit which is the electrical counterpart of the physical system.

Each of these three circuits is subject to wide variation in specific arrangement depending upon the particular mechanical system to be analyzed. In this connection, the basic considerations for the excitation circuit of part 1 are to provide and arrange electrical elements so that the electrical excitation quantities, or forcing functions produced in the circuit are representative of the analogous physical quantities.

The basic considerations of the circuit of part 2 are to provide an electrical circuit representative in its elements and their relationship of the physical system to be analyzed.

The basic considerations of the circuit of part 3 are to provide and arrange electrical elements interconnecting the circuit of part 1 and part 2 such that the forcing functions are applied to the circuit of part 2 according to the electrical analogy of their application to the mechanical system and further to so design the circuit that the forcing frequencies are unaffected by the electrical characteristics of the circuit of part 2.

In mechanical systems, there are several possible analogies between the physical mechanical elements, mass, spring constant, etc., and the electrical circuit elements, inductance, capacitance, etc. These have been classified in Table I below as the mass-inductance circuit and the mass-capacitance circuit. For each of these equivalent circuits there are numerous analogies that can be established between the mechanical and electrical variables (force, displacement, velocity, etc., and voltage, charge, current, etc.). The two most useful analogies for each of the circuits are listed in Table I.

TABLE I

*Four methods of obtaining analogous electrical circuits for mechanical systems*

| Mechanical System | Analogous Electrical System | | | |
|---|---|---|---|---|
| | Mass Inductance Circuit | | Mass Capacitance Circuit | |
| | Voltage $(V)$ = force or torque | $\frac{d(V)}{dt}$ = force or torque | Current $I$ = force or torque | $\frac{d(I)}{dt}$ = force or torque |
| Mass or Inertia | Inductance $(L)$ | | Capacitance $(C)$ | |
| Velocity Damping | Resistance $(R)$ | | Conductance $\left(\frac{1}{R}\right)$ | |
| Spring Constant | Susceptance $\left(\frac{1}{C}\right)$ | | Inverse Inductance $\left(\frac{1}{L}\right)$ | |
| Force or Torque | Voltage $(V)$ | $\frac{d(V)}{dt}$ | Current $(I)$ | $\frac{d(I)}{dt}$ |
| Displacement | Charge $(\int Idt)$ | $(I)$ | $(\int Vdt)$ | $(V)$ |
| Velocity | $(I)$ | $\frac{d(I)}{dt}$ | $(V)$ | $\frac{d(V)}{dt}$ |
| Acceleration | $\frac{d(I)}{dt}$ | $\frac{d^2(I)}{dt^2}$ | $\frac{d(V)}{dt}$ | $\frac{d^2(V)}{dt^2}$ |

The choice of analogy depends upon a number of factors. For most transient problems a direct record of the measured variable as a function of time can most easily be obtained with a cathode ray oscilloscope, which is essentially a voltage measuring device. Therefore, when possible, it is best to use the analogy for which the desired quantity is proportional to a voltage. Table I thus becomes a guide to determine the most useful analogy. Its use is best shown by a discussion of a simple example, such as that illustrated in Figs. 1 to 4.

Figure 2:
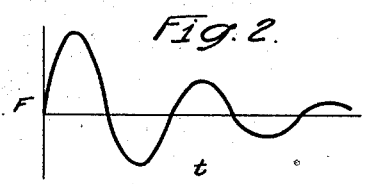
Fig. 2 is an assumed forcing function for the problem of Fig. 1.

Fig. 1 illustrates a simple mass-spring system in which the problem to be analyzed includes a mass having an inertia constant M, a dashpot having a constant G and a spring having a spring constant K which is subject to a damped sinusoidal force of the character shown in Fig. 2. If it were desired to construct a mechanical model of this problem, the forcing function of Fig. 2 could be produced by the mechanical excitation system including a mass with inertia constant $m_1$, a dashpot with the constant $g_1$, and a spring having the spring constant $k_1$. This excitation system, when acting by itself, will have a velocity proportional to that of the desired excitation when allowed to oscillate freely from some initial displacement. If this excitation system is coupled to the actual mechanical system by a dashpot having the constant $g_0$, the force impressed upon the mass M will be proportional to the product of the transmitting capacity of the dashpot $g_0$ and the relative velocity between the masses $m_1$ and M. When the velocity of M is small compared to that of $m_1$, the force transmitted across the dashpot will be proportional to the velocity of the excitation system alone. In order for this condition to be satisfied, $g_0$ must be small compared to the mechanical impedance of the mechanical system including the elements M, G, and K. Then the velocity of the excitation system is practically independent of the mechanical system. Also the damping of the mechanical system is practically proportional to the sum of the capacities of G and $g_0$, while the damping of the excitation system is proportional to the sum of the capacities of the dashpots $g_1$ and $g_0$.

The mass-inductance analogy for this system is shown in Fig. 3. If it is desired to determine the forces acting upon the elements of the mechanical system then the voltage-force analogy is most useful. From Table I, for the voltage-force analogy, current is proportional to velocity. Thus, it is necessary to develop in the analogous electrical excitation circuit a current proportional to the forcing function, that is, a current having the characteristics of the forcing function shown in Fig. 2. In Table I the electrical counterparts of mass, velocity damping (mechanical resistance of the dashpots) and spring constants are respectively inductance (L), resistance (R) and capacitive susceptance $(1/c)$. The ratio of the relative values of the electrical elements having the noted characteristics and their relationship in the analogous electrical circuit depends upon the mechanical setup.

Thus the electrical counterpart of the mechanical problem on the basis of the mass-inductance analogy is as illustrated in Fig. 3. Here the excitation circuit comprises a capacitor $c_1$ corresponding to the spring $k_1$, a resistor $r_1$ corresponding to the dashpot $g_1$, and an inductor $l_1$, corresponding to the mass $m_1$. These elements are electrically related in a manner analogous to the corresponding mechanical elements. A charging circuit including a suitable source of electrical energy E as a battery and a resistor $r$ in series therewith which serves to isolate the charging circuit when the switch S is closed, is connected across the capacitor $c_1$, to effect charging thereof. The output of this circuit is adjustably applied to a resistor $r_0$ which corresponds to the dashpot $g_0$. The circuit thus far described may be termed the excitation circuit, since, it is in this circuit that the electrical counterpart of the forcing functions of the mechanical setup are produced. The electrical circuit representing the mechanical system including the elements M, K and G comprises the respectively related inductive, resistive and capacitive elements L, R and C. These elements are electrically related in a manner analogous to the corresponding mechanical elements and the circuit terminals are connected across the terminals of the resistor $r_0$.

In the analogy circuit thus provided, charging of the capacitor $c_1$ corresponds to compressing of the spring $k_1$. The electrical system is then released and allowed to oscillate freely by closing the switch S and discharging the capacitor $c_1$. The voltage drop produced by the discharge current across the resistor $r_0$ corresponds to the force transmitted across the dashpot $g_0$ by the velocity of the mechanical excitation system of Fig. 1. From the analogy between the mechanical and electrical systems, it is seen that the current in the excitation circuit must be kept high relative to that in the circuit representing the mechanical system and the coupling resistance of $r_0$ must be relatively low compared to the electrical impedance of the mechanical circuit including the elements L, R and C so that substantial independence of the principal circuits is achieved. The voltages across the circuit elements L, R and C give the forces on the analogous mechanical elements. In addition, as shown in Table I, they are also respectively proportional to the system acceleration, velocity and displacement.

The mathematical relationship of these voltages to the system forces, as well as their proportionality to the system acceleration and velocity, is more specifically shown in Table II below.

TABLE II

*Mass-inductance force-voltage analogy*

| Inertia ($I'$) | Inductance (L) |
|---|---|
| Force=Inertia×Acceleration $F=I'\frac{da}{dt}$ where $I'$ is inertia as distinguished from current I. | Voltage=$L\frac{dI}{dt}$ |

| Spring Constant ($K$) | Capacitance ($C$) |
|---|---|
| Force=$K$×Displacement $F=K\times Vdt$ where $V$ is velocity | Voltage=$\frac{1}{C}Idt$ |
| Velocity Damping ($g$) | Resistance $R$ |
| Force=$GV$ | Voltage=$RI$ |

The mass-capacitance analogy circuit of Fig. 4 is the dual of the circuit of Fig. 3. If the force-current analogy is used (see Table I), the desired forcing function must be introduced into the circuit representing the analogy of the mechanical system as a given current. Thus the excitation circuit is a current generator (instead of a voltage generator) and the resistor $r_0$ is omitted. It produces a current that is not affected by the analogous mechanical circuit. It, therefore, follows that the impedance of the analogous mechanical circuit is sufficiently low that it offers negligible impedance to the excitation circuit. Conversely the excitation circuit offers a very high impedance to the analogous mechanical circuit. The elements L, C and R of the mechanical circuit are now connected in parallel relationship in accordance with the new requirements. The currents flowing in the circuit elements L, R, and C are proportional to the forces on the analogous mechanical elements and they are also respectively proportional to displacement, velocity and acceleration. The reasoning here is similar to that of the mass-inductance analogy and the information presented in Table I under the heading Mass-capacitance circuit showing the relationship of the circuit characteristics is sufficient to construe the above-noted facts.

The determination of the magnitude of the analogous circuit constants is illustrated by the equations below.

*Equations for analogous electrical constants*

| Mass-Inductance Circuit | Mass Capacitance Circuit |
|---|---|
| $L=aM$ | $C=aM$ |
| $C=\frac{1}{N^2Ka}$ | $L=\frac{1}{N^2Ka}$ |
| $R=NGa$ | $R=\frac{1}{NGa}$ |

$N$ is the ratio of frequencies in electrical circuits to actual mechanical system frequencies.
$K$ is the spring constant.
$G$ represents the dashpot characteristics.
$a$ is an arbitrary constant.

It is necessary to maintain the same ratios between the magnitudes of the analogous quantities in the electrical and mechanical systems. Thus, for the mass-inductance analogy circuit, all of the inductances in the electrical circuit must have the same ratio to each other as the masses in the mechanical system. When it is desired to set up an electrical system having the same frequency or time base as the actual mechanical system, the same ratio must be maintained between the numerical value of each set of inductance and capacitance as exists between the masses and spring constants of the mechanical system. The same applies to the ratio between the masses and the velocity damping constants. However, the time base may be changed arbitrarily to any desired value without affecting the solution, by adjusting the constants. This is accomplished in the above-listed equations by the factor N. This factor is the ratio of the frequencies in the electrical circuits to the corresponding frequencies in the actual mechanical system. Since linear equations are involved, the ratio of the magnitudes of the responses to the known magnitude of the excitation or forcing function determines the absolute magnitudes of the responses and the constants ($a$) of the equations is arbitrary.

The foregoing disclosure has set forth the basic concept of the invention as to the method of treating the problem of analysis of a given mechanical problem and the electrical means by which a proper analysis of the mechanical problem may be made. As previously noted, there are three basic circuit systems in the electrical analogy of any mechanical problem, one for producing the electrical equivalent of the forcing functions, one which is the electrical analogy of the mechanical system to be analyzed and one which applies the forcing functions to the electrical analogy circuit to simulate electrically the application of the forcing functions in the mechanical system. All three basic circuits are subject to a wide variety of modification depending upon the considerations of a specific problem. These basic considerations are applicable to any physical problem, the mechanical application being merely illustrative. Thus it is not the purpose of this application to teach specifically the considerations involved in various types of problems but rather to set forth the principles by which one skilled in the art may properly approach a given problem and construct and so arrange and relate the three principal circuit systems as to obtain an electrical counterpart of the specific physical problem. That the analyzer system herein disclosed is subject to wide variation is apparent upon a review of Fig. 5-16 inclusive which show various forms of transient functions that are readily obtainable with the electrical excitation circuits.

By way of illustration of the various applications of the analyzer system a few specific problems are hereinafter briefly disclosed. In these applications, it will be noted the principal circuit systems are utilized. In some applications synchronous rotating switches are utilized to apply the various excitation functions periodically to the analogous electrical system so as to produce a standing wave representing the problem solution on the screen of a cathode ray oscilloscope. This method has been employed in the study of transient conditions in electrical power systems as well as in the study of physical problems. During a short interval between each application of the excitation or forcing function synchronous switches short out the various capacitors in the physical circuit, thereby removing the energy therefrom and placing the circuit at rest for the next succeeding application of the excitation or forcing function. Also, during this period the capacitors of the excitation circuit are recharged by reconnection to the charging circuit through the medium of synchronous switches in the excitation circuit.

One type of problem for which the device of this invention is readily adapted is the study of the shaft torques in turbo-generators during electrical short circuits. The electrical torque produced on the generator rotor consists in part of damped sinusoidal components of fundamental and harmonic frequencies, together with damped unidirectional components. Typical forms of these electrical torques are shown in Figs. 17 and 18. The harmonic frequency torques, however, are not illustrated. Figs. 19 and 20, respectively, show the resulting generator rotor shaft torques and the turbine shaft torques.

A simplified diagram of a circuit employed for a problem of the character mentioned above is shown in Fig. 22. This diagram illustrates the manner in which several excitation functions of both directions may be applied to a given point in the analogous electric circuit and is the mass-inductance type of analogy circuit. The excitation circuit comprises a source of energy E which supplies a number of parallel circuit branches each of which includes an isolation resistor $r'$ and each of which circuit branches is connected across one of the capacitors $c_1$, $c_2$ and $c_3$. The circuits for producing the forcing functions are essentially of the form of a loop circuit including a predetermined portion of the resistor $r_0$ across which the total forcing function appears as a voltage, and having as a common circuit leg the circuit including the synchronous switch SS. One excitation circuit branch including the circuit elements $c_1$, $l_1$ and $r_1$, extends from a point on the common synchronous switch leg to a point at the upper extremity of the resistor $r_0$. A second branch including the circuit elements $c_2$, $l_2$ and $r_2$ extends from the common leg to the opposite extremity of the resistor $r_0$. A third circuit branch including the circuit elements $c_3$ and $r_3$ extends from the common leg to a point on the resistor $r_0$ intermediate the upper extremity of the resistor $r_0$ and the connection of the common circuit leg thereto. Thus the total voltage across the resistor $r_0$ at any instant is the algebraic sum of the voltages over the various tapped sections which result from the currents flowing therethrough from the different excitation circuit branches. By way of example, in the case of generator torques the third circuit branch comprising the resistor and capacitor $r_3$ and $c_3$ would produce the damped unidirectional component; the second circuit having elements $c_2$, $l_2$ and $r_2$ may produce the fundamental frequency component, and the first circuit having elements $c_1$, $l_1$, and $r_1$ may produce another component of the same frequency, or of a higher or lower frequency depending upon the case involved. The excitation function produced by the second circuit branch is applied in opposition to those produced in the two remaining branches. Only a fragmentary portion of the mechanical circuit is shown here, since, this is merely an illustrative case and no specific problem is involved. While in this instance the excitation is applied at a given point in the mechanical circuit, it is also, of course, relatively simple to apply excitation at several points in the analogous mechanical circuit. Similarly a constant voltage or current may be applied to the resistor $r_0$ at any desired point by means of a battery or generator to represent a constant force.

The resistor $r_0$ is satisfactory for developing voltages representing forcing functions in cases where sine functions of the forcing functions exist. If other functions, for example, cosine functions appear in the forcing functions an impedance circuit including a resistor such as $r_0$ and an inductor may be used, the inductor for producing the cosine functions. Circuits of this character appear hereinafter.

The first problem to be considered is illustrated in Fig. 23. The mechanical system includes a generator rotor having inertia constant $I_1$, and two turbines respectively having inertia constants $I_2$ and $I_3$. These three elements are connected along a common shaft and the shaft elements between the rotors have spring constants which are designated $K_1$ and $K_2$. The problem is to determine the shaft torques caused by the air gap torques at the generator rotor as a result of short circuit.

The mass-inductance, force-voltage analogy circuit for this system is illustrated in Fig. 24 and comprises the series parallel circuit including the circuit elements $L_1$, $L_2$ and $L_3$, respectively representing the mechanical inertias $I_1$, $I_2$ and $I_3$ and the parallel connected capacitors $C_1$ and $C_2$ respectively representing the shaft element spring constants $K_1$ and $K_2$. The total air gap torque designated $E_0$, in the drawing is produced across the impedance circuit, containing the resistor $r_0$ and inductor $l_0$ which is the electrical analogy of the manner in which the air gap torque is introduced into the mechanical system. The voltage $E_0$ is the algebraic sum of the voltages produced by the excitation currents flowing in the impedance circuit. For this specific problem the forcing functions comprise a damped unidirectional component of torque and a damped fundamental frequency component of torque such as shown in Fig. 17. A damped second harmonic component may also be present. In the excitation circuit the circuit including the capacitor $c_1$ and the resistor $r_1$ produces the damped unidirectional component of torque; the circuit including the capacitor, resistor and inductor respectively identified as $c_2$, $r_2$ and $l_2$ produces the fundamental frequency component, and the circuit including the elements $c_3$, $r_3$ and $l_3$ produces the second harmonic component, if such component is present. The fundamental frequency component and the second harmonic component may have both sine and cosine terms. These are produced simultaneously across the resistor and inductor $r_0$ and $l_0$ forming the impedance circuit. Each of the three excitation circuit branches are isolated by relatively high resistances designated $r'$ and are periodically connected simultaneously to the impedance circuit by means of the synchronous switch SS. A variant in the charging circuit from the battery previously shown comprises a rectifier and a transformer T connected to any suitable alternating current source indicated by the sinusoidal wave between the primary terminals of the transformer. This circuit is connected across the capacitors to effect charging thereof. In the mechanical circuit cathode ray oscilloscopes $CRO_1$ and $CRO_2$ are connected across each of the capacitors $C_1$ and $C_2$. Upon operation of the synchronous switch providing periodic application of the voltage $E_0$ to the mechanical circuit, this circuit produces an electrical response representative of the response of the mechanical system to the stated force applications. The resulting shaft torques appear as voltages across the two capacitors $C_1$ and $C_2$ and the cathode ray oscilloscopes provide a standing wave indication which may be studied and, of course, photographed, if desired. The indication at the oscilloscope $CRO_1$ represents the generator shaft torque at the shaft section $K_1$ and for the conditions graphically shown in Figs. 17 and 18 is of the form shown in Fig. 19. The turbine shaft torque at the shaft section $K_2$ appears at the oscilloscope $CRO_2$ and is represented in Fig. 20.

The second problem illustrates a more complicated mechanical system in which it is likewise desired to determine the shaft torques resulting from a three phase short circuit, at no load on one of two generators driven by a geared turbine. The mechanical system is shown in Fig. 25 and the electrical analogy in Fig. 26. It comprises the two generator rotors having masses $I_1$ and $I_2$ connected together with the gears of the gear drive having a mass $I_3$ on a common shaft. The spring constants of shaft sections between these three elements are designated $K_1$ and $K_2$. The turbine rotor has the inertia constant or mass $I_4$. The spring constant of the connecting turbine shaft is designated $K_3$. The generator while not so illustrated in this case has salient poles and the air gap torque resulting from the short circuit comprises a damped unidirectional component and a series of damped sinusoidal components at fundamental and harmonic frequencies. The equation for the air gap torque $T_e$, including components up to the fourth harmonic frequency is:

Per unit $T_e = e^{-4.3t}(6.2 \sin wt + 4.65 \sin 3wt)$
$- e^{-3t}(2.13 \sin 2wt + 1.95 \sin 4wt)$
$+ 1.2 e^{-3t}$ The total electrical torque is graphically shown in Fig. 27 for the time base shown by the timing cycle sweep of Fig. 29.

The analogous electrical circuit for the mechanical system shown is the series parallel circuit of Fig. 26. This is the mass-inductance, voltage-force analogy circuit. Each of the mass elements of the mechanical system has its inductive counterpart in the inductive elements $L_1$ to $L_4$ inclusive and the respective shaft sections are represented by the capacitors $C_1$ to $C_3$ inclusive which are connected in parallel between the inductive elements to form the electrical analogy of the mechanical system. In this problem the generator having the rotor $I_2$ is short circuited, hence, the voltage $E_0$ representing the total air gap torque is applied between the capacitors $C_1$ and $C_2$, representing the shaft $K_1$ and $K_2$ just as the mechanical torques are applied between these shaft sections. This analogy circuit is again by reason of convenience the mass-inductance, voltage-force type and hence includes an impedance circuit including the inductance element $l_0$ and the resistance element $r_0$ for producing the quantity $E_0$ representing the total electrical torque of Fig. 27. The circuit system for producing the forcing functions includes the circuit branches designated Cir. 1 to Cir. 6 inclusive. Cir. 1 produces the damped non-oscillatory component; Cir. 2 produces the fundamental frequency component and Cir. 3–Cir. 5 inclusive produce the second to fourth harmonic frequency components. Again by means of the synchronous switch SS the forcing functions are simultaneously applied to the impedance circuit where the total electrical torque $E_0$ as illustrated in Fig. 27 is produced. The oscilloscope $CRO_1$ provides the indication of torque at the shaft section $K_1$ as shown in Fig. 31; the oscilloscope $CRO_2$ provides the indication of shaft torque of Fig. 28 for shaft section $K_2$, and the oscilloscope $CRO_3$ provides the indication of shaft torque for section $K_3$ which is shown in Fig. 32. Fig. 30 represents the timing cycle sweep for the related curves. It is obvious that the analytical solution of this problem would be difficult to say the least. This invention, however, reduces the problem to a relatively simple one. In addition to shaft torques, it is also possible to obtain data on maximum stresses in the teeth of the gear drive, also by using the velocity-voltage analogy of Table I and measuring velocities some estimate of impact forces on the gear teeth during torque reversals may be obtained.

The final example illustrates the use of the analyzer of this invention for studying the ridability of a vehicle. The problem is to determine the motion of the wheels and body as the vehicle passes over a stepped surface in the roadway while traveling at a given speed. Fig. 33 illustrates the problem and Fig. 34 illustrates the mechanical equivalent. The body of the vehicle is represented by the large mass M which has a mass distribution such that its moment of inertia corresponds to that of the vehicle. The wheels are represented by the smaller masses $M_1$ and $M_2$. The mass $M_1$ is connected between a stationary base and one extremity of the body mass M by means of a pair of springs respectively having spring constants $K_1$ and $K_2$, representative of the spring constants of the vehicle tires and the body springs. A similar system including springs having constants $K_3$ and $K_4$ carries the mass $M_2$. Dashpots $G_1$ and $G_2$ mechanically simulate the desired damping of each of the springs associated with the main mass.

Two types of analogy circuits are illustrated for this problem, the mass-inductance analogy being shown in Fig. 35 and the mass-capacitance analogy being shown in Fig. 36.

In the mass inductance analogy the effect of the stepped surface in the roadway is introduced into the electrical circuit by the voltages $e_1$ and $e_2$. The voltage $e_1$, which is proportional to the sudden displacement of the bottom of the front tires, is a constant voltage suddenly applied at time zero. The voltage $e_2$, which represents the sudden displacement of the bottom of the rear tires is a similar voltage applied a given time $t$ later depending upon the wheel base and the velocity of the vehicle. The displacements represented by these voltages are indicated in Figs. 37 and 41 along the ordinates as D. It should be noted at this point that the forcing functions represented by the source voltages $e_1$ and $e_2$ are simple in nature and hence may be indicated as shown. If the problem were to study the vehicle motion along an irregular road surface producing forcing functions of various frequencies, magnitudes and phase an excitation circuit to produce these functions and properly apply them to the analogy circuit is required. In Fig. 35 the inductance elements $L_1$ and $L_2$ correspond to the front and rear wheel masses $M_1$ and $M_2$. The body mass corresponds to the Y connected inductor group L. The spring constants of the spring elements $K_1$, $K_2$, $K_3$ and $K_4$ are respectively represented by the capacitors $C_1$-$C_4$ inclusive, and the dashpot damping represented in its electrical counterpart the resistance elements $R_1$ and $R_2$. The currents $i_1$ and $i_3$ are the analogous velocities of the wheels (see Table I Mass inductance, voltage-force analogy) while the currents $i_2$ and $i_4$ are the velocities of the two ends of the body. The displacement of the wheels is represented by the voltage across the capacitor $C_1$ for the front wheels and by the voltage across the capacitor $C_3$ for the rear wheels. The relative displacement between the front wheels and body appears as voltage across the capacitor $C_2$ and the motion between the rear wheels and body appears as a voltage across the capacitor $C_4$. The absolute motion of the body may be determined as a voltage across the capacitor $C_5$ shunted by the inductance element $l_5$. The mechanical analogy of this is not shown in the mechanical system, however, it is apparent that this motion could be measured mechanically by suspending a mass from a very weak spring at either end of the body mass. By adjusting this auxiliary system so that its period is very long compared to the period of the body motion, the relative displacement between the body and the suspended mass will be a measure of the absolute body motion. The electric analogy of this system is a very large capacitor as $C_5$ shunted by the inductor $l_5$ which represents the suspended mass. This circuit is so disposed that either the current $i_2$ or $i_4$ must flow therethrough depending upon which end of the vehicle the mass is suspended. The voltages developed across the capacitor $C_5$ are proportional to the absolute body motion. The wheel motion, the relative motion between the wheels and body as well as the body motion for both the front and rear ends of the vehicle body are illustrated in Figs. 37 to 44 inclusive. While no effort has been made to present a complete analysis of the problem, it is evident that this invention provides a means for studying a wide variety of mechanical designs and the effect of various road surfaces on the motion of the vehicle. In this connection it will be understood that any suitable type of excitation circuit on the basis of the theories herein disclosed may be substituted for the source of excitation indicated in Figs. 35 and 36.

Many mechanical devices, when damping is not purposely introduced, are inherently low loss systems. For certain problems, this requires low loss capacitors and inductors for the analogous circuits. For such systems the hysteresis loss of the materials being deformed will produce damping of from one to three percent per cycle. Usually the additional absorption energy of various coupling, fits, bearings, etc., will raise the damping to at least three or four percent per cycle. Since it is more difficult to build inductors with as low loss as capacitors, the design of this circuit element may require special consideration. The loss characteristic of an inductor is defined in terms of the factor $$\left(Q = \frac{\omega L}{R}\right)$$

the ratio at a given frequency of the reactive to the resistive components of the coil impedance. Table III below shows the effect of Q on amplitude-decay factors for coils in systems having one degree of freedom. This implies that the associated capacitor is perfect. It will be noted that damping less than three per cent per cycle requires coils with a (Q) of one hundred or better. For such applications inductor coils with a maximum (Q) of about one hundred and eighty have been developed and which have a (Q) in excess of one hundred over a frequency range of 200 to 1000 c.p.s.

TABLE III

*Amplitude decay factors of inductors*

Decay factors — $\frac{T\pi}{2Q}$ in per cent

[Number of half cycles]

| Q | 1 | 2 | 3 | 4 | 5 | 6 | 7 | 8 |
|---|---|---|---|---|---|---|---|---|
| 40 | 96 | 92 | 88 | 85 | 81 | 78 | 75 | 72 |
| 100 | 95.5 | 97 | 95.5 | 94 | 92.5 | 91 | 89.5 | 88.3 |
| 200 | 99.1 | 98.1 | 97.4 | 96.2 | 95.3 | 94.5 | 93.6 | 92.7 |

The importance of the inductor loss depends upon the problem being studied. When the crest magnitude of the response function occurs within the first one or two half cycles of oscillation, the losses of the inductors are not so important. That this is true may be seen from Table III. Coils with a (Q) as low as forty would give a solution with the peak of the second half cycle that is only five percent below the solution obtainable with a coil having a (Q) of one hundred. The solution will usually be of this nature unless one of two conditions exists. The first is that a system frequency is very close to resonance with the frequency of the dominant excitation function. The second condition is that the particular excitation function has about the same degree of damping as the corresponding mode of mechanical oscillation. If damping losses are found too high, negative damping may be introduced by means of vacuum tube circuits. Figure 21 is illustrative of low loss damping which has been obtained in a simple inductance capacitance circuit with the low loss elements supplied with square wave excitation. The frequency of oscillation is two hundred cycles per second and the measured damping is about three percent per cycle.

This invention measurably facilitates the analysis of difficult mechanical problems and is applicable through slight modification in its details, but not in its principles, to a wide variety of physical problems. The various mechanical systems hereinbefore described illustrate the usefulness of this invention in extending the rather narrow range of quantitative solutions possible by analytical methods. It can be stated that any physical system which may be represented by linear equations is subject to analysis according to the teachings of this invention.

The foregoing disclosure and the showings made in the drawings are merely illustrative of the principles of this invention and are not to be interpreted in a limiting sense. The only limitations are to be determined from the scope of the appended claims.

We claim as our invention:

1. In a system of electrical analysis for determining the response of a physical system to a transient condition and which transient condition is comprised of components including a damped unidirectional component and a damped component of known frequency, the combination of, an electrical analogy circuit constructed of circuit elements having electrical properties analogous to the properties of the physical system, an excitation network having a first circuit including a resistor for producing an electrical quantity representative of said damped unidirectional component and a second circuit including a resistor and an inductor for producing an electrical quantity representative of said damped component of known frequency, a capacitor connected in each of said first and second circuits for discharge therein, means for supplying an electrical charge to each of said capacitors, a coupling circuit connecting the analogy circuit and the excitation network for algebraically combining the electrical quantities of said first and second circuits and applying the resulting electrical quantity to said analogy circuit, means forming a part of said first and second circuits for effecting the repeated production of both said electrical quantities whereby said resulting electrical quantity is repeatedly applied to said analogy circuit, and oscilloscope means electrically connected to said analogy circuit to be energized thereby for indicating the response of said analogy circuit to said repeatedly applied electrical quantity.

2. An electrical analyzer for determining the response of a physical system to known transient conditions by which it is affected comprising, in combination, an electrical analogy circuit having electrical characteristics representative of the characteristics of said physical system, means for supplying electrical energy, an excitation cricuit connected with said means for supplying electrical energy for producing transient electrical quantities which are the electrical equivalent of said known transient conditions, circuit means connecting said analogy circuit and said excitation circuit for applying said transient electrical quantities of the excitation circuit to said analogy circuit, cyclically operable switching means forming part of said excitation circuit for opening and closing the said excitation circuit in rapid sequence and causing said transient electrical quantities to be reproduced at a rapid rate whereby said analogy circuit is repeatedly energized by the successive transient electrical quantities, means forming a part of the connection of said excitation circuit with said means for supplying electrical energy for substantially electrically isolating said excitation circuit from said means for supplying electrical energy upon closure of said excitation circuit by said switching means, and oscilloscope means electrically connected to said electrical analogy circuit to be energized thereby for indicating the response of said analogy circuit to the applied transient electrical quantities.

3. An electrical system of analysis for determining the response of a physical system to a transient exciting condition by which the physical system is affected comprising, in combination, an electrical analogy network which electrically represents the physical system, an electrical excitation circuit comprised of electrical components which are responsive to excitation in a manner to produce an electrical quantity representative of said transient condition, means including a capacitor for exciting said electrical excitation circuit, switching means for alternately connecting and disconnecting said capacitor with said electrical excitation circuit according to a predetermined cycle of operation to cause repeated discharge of said capacitor into said electrical excitation circuit, circuit means connecting said electrical analogy network with said electrical excitation circuit, so that said electrical analogy network has repeatedly applied thereto said electrical quantity, and at least one oscilloscope electrically connected to said analogy network to be energized thereby for indicating the response of said analogy network to the repeatedly applied electrical quantity.

4. In an electrical system of analysis for determining the response of a physical system to a transient condition by which the physical system is affected and which transient condition is comprised of a plurality of components, the combination of, circuit means constructed and arranged to form the electrical analogy of the physical system, an excitation circuit network including a plurality of electrical circuits each of which is comprised of electrical elements to produce an electrical quantity corresponding to one of the said components of said transient condition, switching means for opening and closing said electrical circuits according to a predetermined cycle of operation, a capacitor connected in each of said electrical circuits to be discharged therein upon closure of the electrical circuits by said switching means, means for supplying an electrical charge to said capacitors, means for combining the electrical quantities of said electrical circuits, means electrically connecting said excitation circuit network and said circuit means to effect energization of the said circuit means in dependence of the combined electrical quantities, and oscilloscope means electrically connected to said circuit means to be energized thereby for indicating the response of said circuit means to said combined electrical quantities.

5. In an electrical system of analysis for determining the response of a physical system to a transient condition by which the physical system is affected and which transient condition is definable in terms of its components, the combination of, an electrical analogy network, comprised of electrical elements which in their characteristics and their relation in the network represent the physical system, an electrical excitation network including a plurality of electrical circuits, each for producing an electrical quantity representative of a component of said transient condition, circuit means connecting said electrical circuits for effecting the combination of all said electrical quantities, and having a circuit branch common to all of said electrical circuits, a rotatable switch connected in said common circuit branch for opening and closing the electrical circuits, a capacitor connected in each electrical circuit to be discharged therein upon closure of said rotatable switch thereby exciting said circuits, means for supplying electrical energy to each of said capacitors, means connecting said electrical analogy network with said circuit means for effecting energization of said analogy network in dependence of the combined electrical quantities, and oscilloscope means electrically connected with said analogy network to be energized thereby for indicating the response of said analogy network to said combined electrical quantities.

GILBERT D. McCANN, Jr.
HARRY E. CRINER.

REFERENCES CITED

The following references are of record in the file of this patent:

UNITED STATES PATENTS

| Number | Name | Date |
|---|---|---|
| 1,654,123 | Hartley | Dec. 27, 1927 |
| 2,087,667 | Hedin | July 20, 1937 |

OTHER REFERENCES

Electro Mechanical Transducers and Wave Filters, by Warren P. Mason; published by Van Nostrand Co. of 250 Fourth Ave., New York, N. Y. (Copy available in Div. 16, of U. S. Patent Office.)